US008788138B1

(12) United States Patent
Yogesha et al.

(10) Patent No.: US 8,788,138 B1
(45) Date of Patent: Jul. 22, 2014

(54) DIAGNOSTIC METHODS AND SYSTEMS FOR AN AIRCRAFT

(71) Applicant: Honeywell International Inc., Morristown, NJ (US)

(72) Inventors: Aralakuppe Ramegowda Yogesha, Karnataka (IN); Sundeep Vanka, Karnataka (IN); Shaik Shafi Ahamed, Karnataka (IN); Srinivasa Rao Dangeti, Pradesh (IN); Zhenning Liu, Mississauga (CA)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/777,664

(22) Filed: Feb. 26, 2013

(51) Int. Cl.
*G07C 5/12* (2006.01)
*G06F 17/00* (2006.01)
*B64F 5/00* (2006.01)
*G07C 5/00* (2006.01)
*G06F 17/50* (2006.01)
*B64D 45/00* (2006.01)

(52) U.S. Cl.
CPC .............. *B64F 5/0045* (2013.01); *G07C 5/006* (2013.01); *G07C 5/008* (2013.01); *G06F 17/5095* (2013.01); *B64D 2045/0085* (2013.01)
USPC ............ 701/29.1; 701/31.4; 701/33.2; 701/3; 345/419

(58) Field of Classification Search
CPC ...... B64F 5/0045; G07C 5/006; G07C 5/008; G06F 17/5095
See application file for complete search history.

(56) References Cited

U.S. PATENT DOCUMENTS

| | | | | |
|---|---|---|---|---|
| 6,122,575 A | * | 9/2000 | Schmidt et al. | 701/31.8 |
| 7,050,894 B2 | * | 5/2006 | Halm et al. | 701/29.4 |
| 7,617,029 B2 | | 11/2009 | Loda | |
| 7,873,494 B2 | * | 1/2011 | Hadley et al. | 702/158 |
| 8,060,835 B2 | * | 11/2011 | Newcomer et al. | 715/782 |
| 8,068,104 B2 | | 11/2011 | Rampersad | |
| 2007/0010923 A1 | * | 1/2007 | Rouyre | 701/29 |
| 2012/0308965 A1 | * | 12/2012 | Andrews et al. | 434/30 |

OTHER PUBLICATIONS

Ronkko, J. et al.; 3D Visualisation as a Tool for Managing Diagnostic and Prognostic Information of Industrial Machinery, ESPOO 2006, VTT Symposium 243, Prognostics for Industrial Machinery Availability, Prognos, Final Seminar, Finland, Dec. 2006.
Banks, J. et al.; Power System Prognostics for the U.S. Army OH-58D Helicopter, The Journal of the Reliability Information Analysis Center—Jan. 2012; IEEEAC paper #1654, Version 2, Updated Oct. 26, 2010.

* cited by examiner

*Primary Examiner* — Michael J Zanelli
(74) *Attorney, Agent, or Firm* — Ingrassia Fisher & Lorenz P.C.

(57) ABSTRACT

A method is provided for diagnosing an aircraft. The method includes: determining a location of a fault in the aircraft; determining a zone of the aircraft that is associated with the location of the fault; and generating an interactive three-dimensional user interface based on the zone, wherein the interactive three-dimensional user interface provides fault data of at least one of historical faults and current faults associated with the zone.

20 Claims, 4 Drawing Sheets

DIAGNOSTIC METHODS AND SYSTEMS FOR AN AIRCRAFT

TECHNICAL FIELD

The present disclosure generally relates to methods and systems for providing diagnostic and prognostic information in three-dimension for an aircraft.

BACKGROUND

Typical maintenance systems of an aircraft provide a user interface that is associated with a vehicle central maintenance system (CMS). Maintenance personnel may access this user interface, for example, via an aircraft data network using a laptop. These systems typically only provide fault and maintenance information in a textual format and by nature are not provided in an environment that effectively facilitates maintenance activities.

For example, maintenance personnel spend considerable time "translating" this textual maintenance information into particular locations of fault components before initiating the maintenance actions. In addition, various equipment fault information is viewed separately in an isolated manner, independent of the geographical properties of the faults. Thus, the existing maintenance system cannot provide an actual cause of the fault that may be based on a particular geographic location where the equipment is installed or path it is run through.

Hence, there is a need for improved systems and methods for providing diagnostic and prognostic information for an aircraft. Other desirable features and characteristics will become apparent from the subsequent detailed description and the appended claims, taken in conjunction with the accompanying drawings and the foregoing technical field and background.

BRIEF SUMMARY

In one embodiment, a method is provided for diagnosing an aircraft. The method includes: determining a location of a fault in the aircraft; determining a zone of the aircraft that is associated with the location of the fault; and generating an interactive three-dimensional user interface based on the zone, wherein the interactive three-dimensional user interface provides fault data of at least one of historical faults and current faults associated with the zone.

In another embodiment, a diagnostic system is provided for an aircraft. The diagnostic system includes a computer readable medium. The computer readable medium includes a first module that determines a location of a fault in the aircraft. A second module determines a zone of the aircraft that is associated with the location of the fault. A third module generates an interactive three-dimensional user interface based on the zone. The interactive three-dimensional user interface provides fault data of at least one of historical faults and current faults associated with the zone.

In still another embodiment, an aircraft is provided. The aircraft includes one or more diagnostic systems, and a computing system in communication with the one or more diagnostic systems. The communication system determines a location of a fault in the aircraft, determines a zone of the aircraft that is associated with the location of the fault; and generates an interactive three-dimensional user interface based on the zone. The interactive three-dimensional user interface provides fault data of at least one of historical faults and current faults associated with the zone.

Furthermore, other desirable features and characteristics of the method and system will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
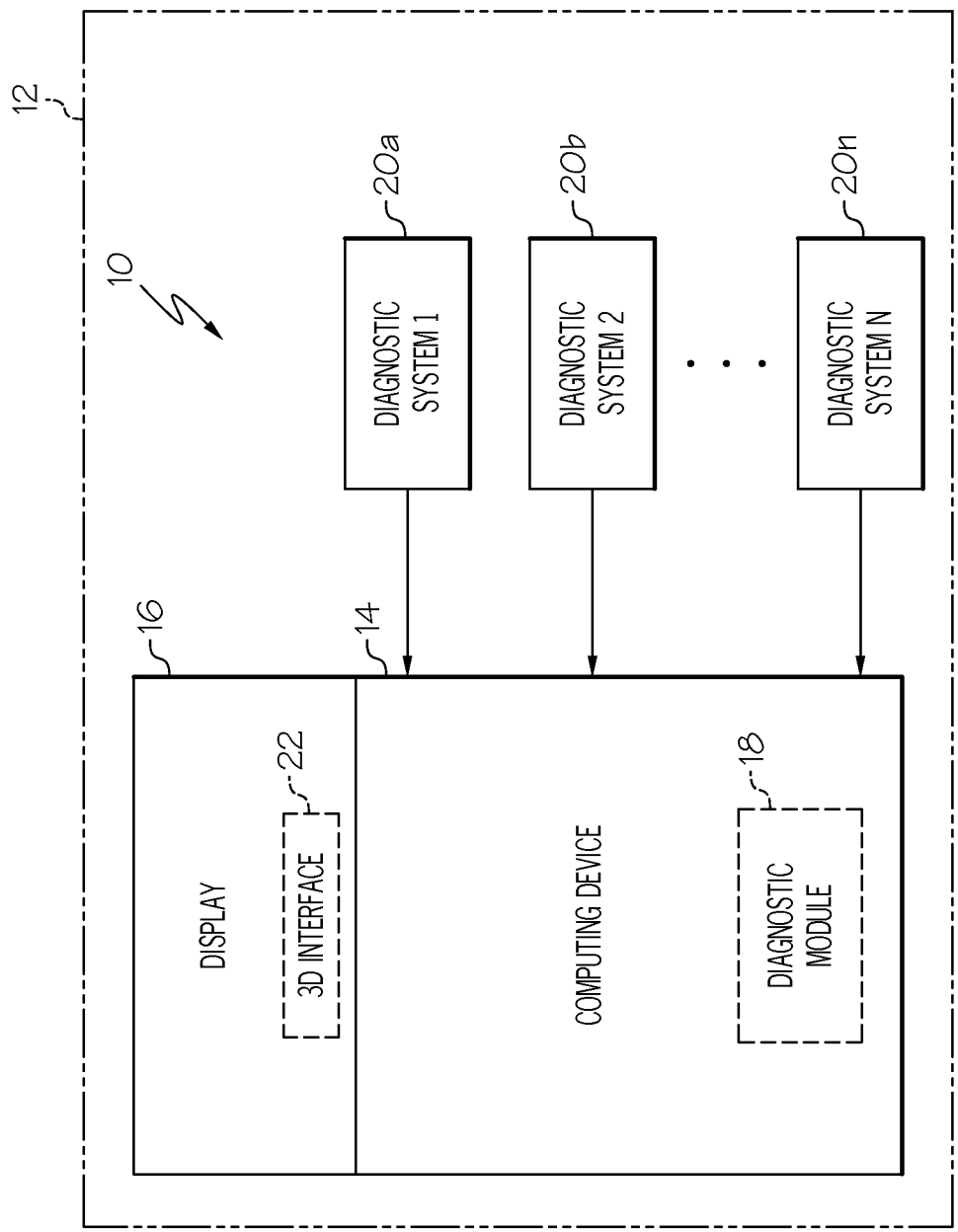
FIG. 1 is a functional block diagram illustrating a diagnostic system for an aircraft in accordance with exemplary embodiments.

Referring now to FIG. 1, exemplary embodiments of the present disclosure are directed to a diagnostic system shown generally at 10 that is associated with an aircraft 12. As can be appreciated, the diagnostic system 10 described herein can be implemented in any aircraft 12 having a computing device 14 onboard that is associated with a display device 16. Alternatively, the diagnostic system 10 described herein can be implemented in any aircraft 12 having a communication port for connecting a portable computing device (not shown) that is associated with a display device (not shown). In various embodiments, the computing device 14 includes at least a processor and one or more data storage devices, that communicate with one or more input device.

In various embodiments, the computing device 14 and the display device 16 may be located in a cockpit of the aircraft 12 for viewing and interaction by, for example, a pilot or maintenance personnel of the aircraft 12. In various other embodiments, the computing device 14 and/or the display device 16 may be located in another area of the aircraft 12 and may be operated by other occupants or individuals associated with the aircraft 12. The computing device 14 and/or the display device 16 may also be contained within a single device. In various embodiments, the display device 16 may be a touch-screen device or other display device capable of rendering three-dimensional images.

The computing device 14 includes a diagnostic module 18 in accordance with various embodiments. The diagnostic module 18 communicates with one or more diagnostic systems 20a-20n of the aircraft 12 to determine a fault of the aircraft 12. Generally speaking, the diagnostic module 18 analyzes historical fault data to generate recommendations of fault activity and/or maintenance decisions based on the current fault. The diagnostic module 18 presents fault information to a user of the system in an interactive three-dimensional format that allows the user to more easily address the fault.

In one example, the diagnostic module 18 can be used to easily identify a fault in one or more wire harnesses associated with the aircraft 12. For example, one of the diagnostic systems 20a-20n may report communication failures of associated equipment and may not able to communicate a status to the computing system 14 of the aircraft 12. A built-in fault detection mechanism inside the diagnostic system 20a (for example) may have determined that the fault is due to a short circuit in a communication cable, and the short circuit point is at X meters away from certain equipment. Typically, maintenance personnel may spend considerable time checking the associated drawing first to eventually find a convenient access point to reach the shorted portion of the communication cable in the aircraft 12, and then perform the repair.

The diagnostic module 18 provides visual information in the form of a three-dimensional interactive interface 22 that allows the maintenance personnel or other user to quickly identify the location of the fault and a most convenient access point to the fault location on the aircraft 12. The three-dimensional interactive interface 22 further allows the maintenance personnel to correctly conclude the root cause of the fault is actually attributed to a completely independent failure in other equipment, as well as to be able to establish recommendations for future design improvements.

For example, in the instance of the shorted portion of the communication cable in the aircraft 12, the maintenance personnel generally visibly observes the cable and forms a conclusion based on this visual observation, such as the damage in the cable looks like a breakdown of insulation due to wire chaffing. Thus, the maintenance personnel would generally conclude that the root cause of this fault is due to poor workmanship during layout of the wiring bundle harness. The maintenance personnel, however, may not be aware of other aircraft equipment located near the cable fault area, and may not know that there has been a recent mechanical failure in that equipment, which eventually caused the insulation breakdown in the communication cable. By using the three-dimensional interactive interface 22, the maintenance personnel may quickly identify that the fault was caused by the failure of other equipment and not caused by poor workmanship.

Figure 2:
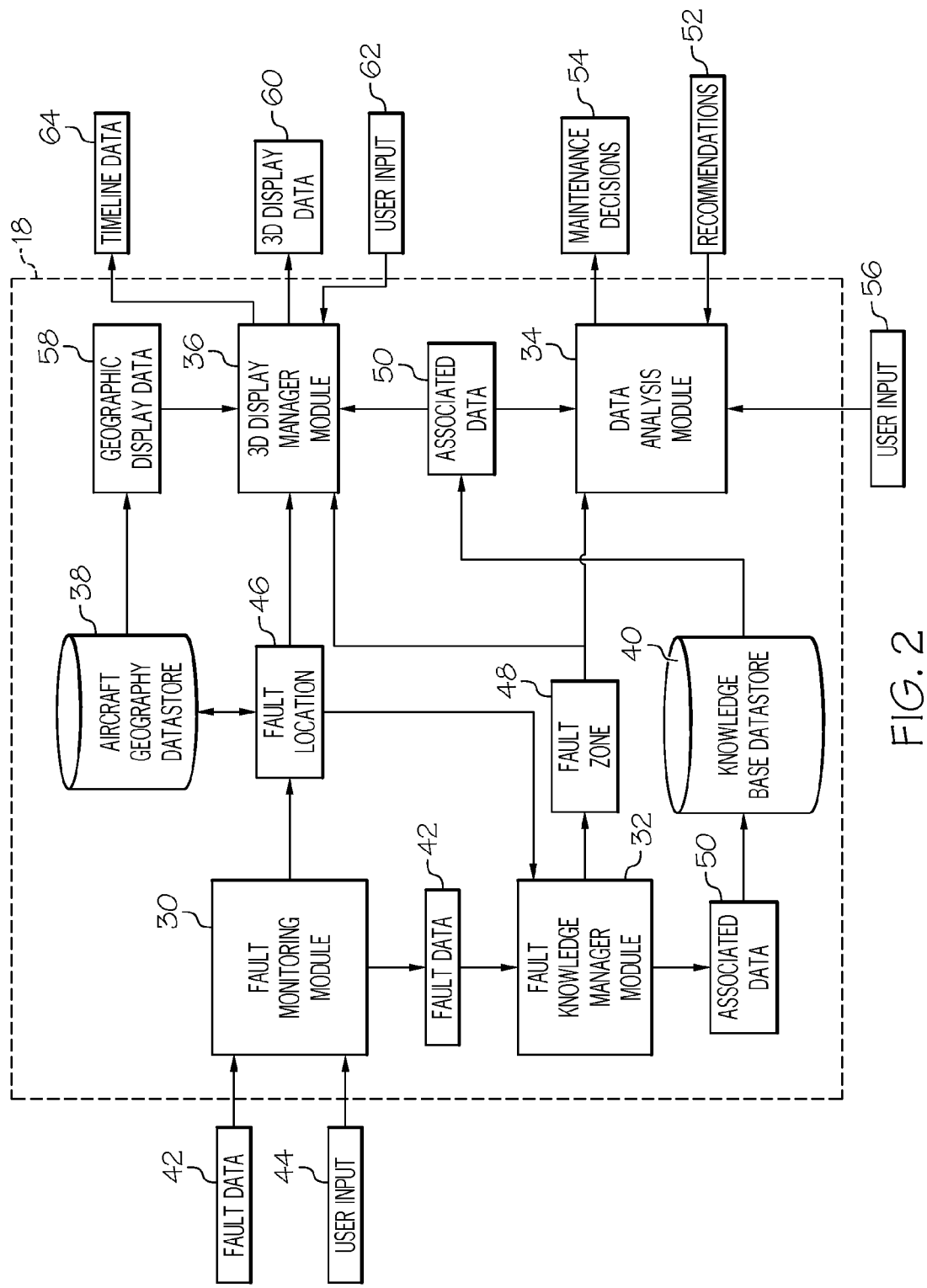
FIG. 2 is dataflow diagram illustrating a diagnostic module of the diagnostic system in accordance with exemplary embodiments.

Referring now to FIG. 2, a dataflow diagram illustrates various embodiments of the diagnostic module 18. Various embodiments of diagnostic modules 18 according to the present disclosure may include any number of sub-modules embedded within the diagnostic module 18. As can be appreciated, the sub-modules shown in FIG. 2 may be combined and/or further partitioned to similarly generate an interactive three-dimensional model illustrating a fault location and an associated fault zone of the aircraft. Inputs to the diagnostic module 18 may be received from the diagnostic systems 20a-20n (FIG. 1) or other modules (not shown) of the aircraft 12 (FIG. 1) or computing device 14 (FIG. 1), determined/modeled by other sub-modules (not shown) within the diagnostic module 18, and/or may be some other form of user input that is based on a user interacting with the computing device 14 (FIG. 1). In various embodiments, the diagnostic module 18 includes a fault monitoring module 30, a fault knowledge manager module 32, a data analysis module 34, a three-dimensional (3D) display manager module 36, an aircraft geography datastore 38, and a knowledge base datastore 40.

The fault monitoring module 30 receives as input fault data 42. The fault data 42 may be generated by one or more of the diagnostic systems 20a-20n (FIG. 1) of the aircraft 12 (FIG. 1) and may include, for example, but is not limited to, a fault identification, a system identification, a fault type, a time of fault, a flight information/phase, and a part number or part type associated with the fault. Alternatively or additionally, the fault data 42 may be entered by a user of the system via user input 44.

Based on the fault data 42, the fault monitoring module 30 determines a location 46 of the fault within the aircraft 12. For example, a fault location 46 may be already associated with the particular type of fault and stored in the aircraft geography datastore 38. The fault monitoring module 30 determines the fault type and evaluates the data of the aircraft geography datastore 38 to see if the fault location for that fault type is stored in the aircraft geography datastore 38. For example, the aircraft geography datastore 38 stores data associated with equipment of the aircraft 12 indicating at least a name of the equipment, a location of the equipment on the aircraft, and any components connected to the equipment of the aircraft 12.

If the location is stored in the aircraft geography datastore 38, that location is generated as the fault location 46. If, however, the location is not stored in the aircraft geography datastore 38, the fault location 46 and other information may be determined by a user via user input 44 and stored in the aircraft geography datastore 38.

The fault knowledge manager module 32 receives as input the fault location 46 and the fault data 42. Based on the inputs 42, 46, the fault knowledge manager module 32 determines a fault zone 48 associated with the fault. For example, the fault knowledge manager module 32 associates information from the fault data 42 with predefined zones to establish the fault zone 48. In various embodiments, the fault zone 48 can be a geographical location/zone that identifies all unrelated faults in nearby locations which experience a high failure rate due to environmental factors such as extreme temperatures, pressures, vibrations, EMI/EMC radiations, moisture or humidity, corrosion, mechanical stress, reparative strain, explosive substances (fuel), etc. In various embodiments, the fault zone 48 can be a power supply zone that identifies all unrelated or related faults in equipment which shares the same power supply or bus. In various embodiments, the fault zone 48 can be a pneumatic or hydraulic circuit zone that identifies all unrelated or related faults in equipment which shares the same pneumatic source. In various embodiments, the fault zone 48 can be a communication circuit zone that identifies all unrelated or related faults in equipment which communicates on the same communication channels. In various embodiments, the fault zone 48 can be a functional zone that identifies all unrelated or related faults based on the equipment operated based on the phases of flight. As can be appreciated, the various zones discussed are merely exemplary in nature and the fault zone 48 can be any identified zone of the aircraft 12 (FIG. 1). For example, the particular architecture or design information of the aircraft 12 and the faulty system can be used to identify the fault zone 48. Once the fault zone 48 is determined, the fault knowledge manager module 32 associates the fault data 42 with the fault zone 48 and stores the associated data 50 in the knowledge base datastore 40.

The data analysis module 34 receives as input the fault zone 48. The data analysis module 34 checks the knowledge base datastore 40 for other faults identified concurrently or historically to be within the particular fault zone 48. If other faults within the zone exist, the data analysis module 34 retrieves the associated data 50 for the other faults from the knowledge base datastore 40 and analyzes the associated data 50 for the particular zone to provide recommendations 52 of possible failure modes, any root-causes or the existing fault, and probable failure effects that are related to the existing fault and other unrelated faults. The data analysis module 34 further analyzes the data to determine appropriate maintenance decisions 54. A user can use this information 52, 54 to carry out necessary maintenance actions as required. The user can also suggest appropriate maintenance decisions based on experience and reasoning via user input 56. The data analysis module 34 can update the knowledge base datastore 40 with the user input 52 for future analysis.

Figure 3:
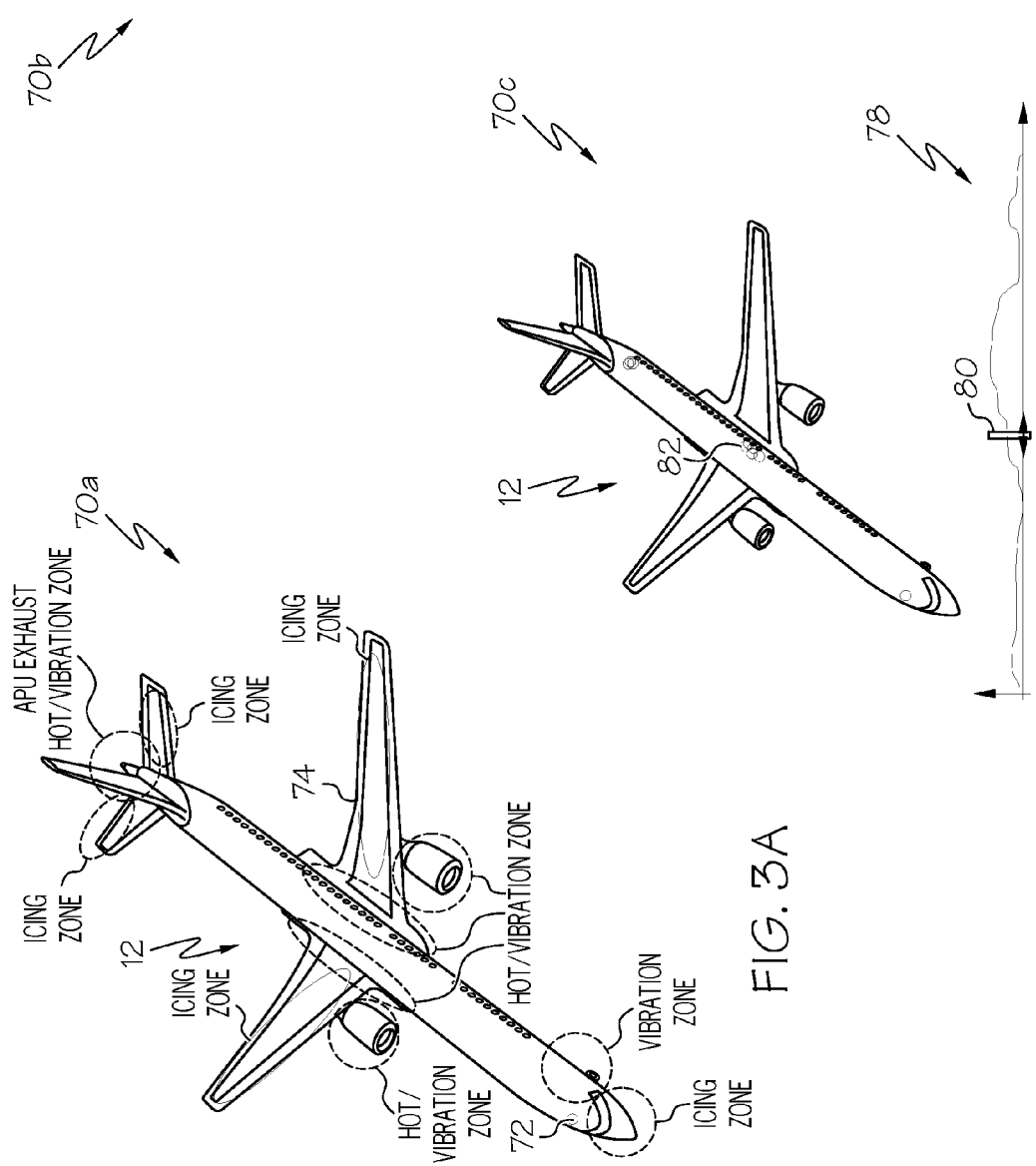
FIGS. 3A-3C are illustrations of three-dimensional interactive interfaces that may be generated by the diagnostic module.

The 3D display manager module 36 receives as input the fault location 46, and the fault zone 48. Based on the fault location 46, the 3D display manager module 36 interfaces with the aircraft geography datastore 38 to retrieve geography data 58. The geography data 58 is used to generate 3D display data 60 that presents an interactive virtual three-dimensional model of the aircraft 12, for example, having a transparent skin (as shown in FIGS. 3A-3C). The fault location 46 is associated with the geography data 58 and the 3D display data 60 is generated that presents the fault location 46 with respect to the interactive virtual three-dimensional model 70a-70c of the aircraft 12. The 3D model 70a-70c allows the user (e.g., a maintenance engineer) to view the exact location 72 of the fault in the aircraft 12.

Based on the fault zone 48, the 3D display manager module 36 interfaces with the knowledge base datastore 40 and the aircraft geography datastore 38 to generate 3D display data 60 that presents an interactive virtual three-dimensional model 70a-70c of the aircraft 12 and the respective zones 74 of the aircraft 12. The interactive model allows a user to navigate through the zones 74 of the aircraft 12 in a transparent skin (as shown in FIGS. 3A-3C). For example, various zones of interest can be selected via user input 62. The various zones, when selected display a more detailed three-dimensional model of the equipment associated with that zone and/or identify the existing and historical faults associated with the zone in a textual or graphical format. For example, FIG. 3B illustrates details of a communication zone 76 of the aircraft 12.

In various embodiments, the interactive model 70a-70c can include a timeline 78 (generated by timeline data 64 (FIG. 2)) of the faults associated with the particular zone (as shown in FIG. 3C). For example, a slider bar 80 can be adjusted along the timeline 78 to a particular time. Any faults 82 present in the aircraft 12 or in the selected zone of the aircraft 12 at that time are displayed on the three-dimensional model 70c. A user can navigate through the timeline data 64 to identify the pattern of occurrence of faults or fault propagation and maintenance history. Using the display, related or unrelated faults can be correlated via user input 62. The observations can be updated in the knowledge base datastore 40 for future reference. This information helps the user to understand the effect of one sub system's fault on other sub systems and helps to drive better maintenance actions. This information may also help to define better failure mode and effects analysis in future design or retrofit of the systems in aircraft.

In various embodiments, the interactive display can be viewed by aircraft designers or investigators to analyze the faults and maintenance activity in various zones for future design improvements. For example, the 3D display manager module 36 can analyze the associated data 50 in the knowledge base datastore 40 to identify the frequency and pattern of occurrence of faults, to identify a propagation of faults from one zone to another, and to identify the cascading impact of such related or unrelated faults. The 3D display manager module 36 generates recommendations for future design improvements based on the analysis. These recommendations can be viewed by aircraft designers to provide to design aircraft features having better flight safety and reduced maintenance efforts. For example, keeping in line with the example provided above, if the system identifies that the fault in the cable harness/wiring is perhaps due to the particular path the wire bundle is run through, where a vibration source may be close by, or corrosive water condensation may easily be built up, then the system my make future recommendations such as, but not limited to, change the route of the particular wiring bundle, or strengthen the insulation for the particular section of the wiring.

Figure 4:
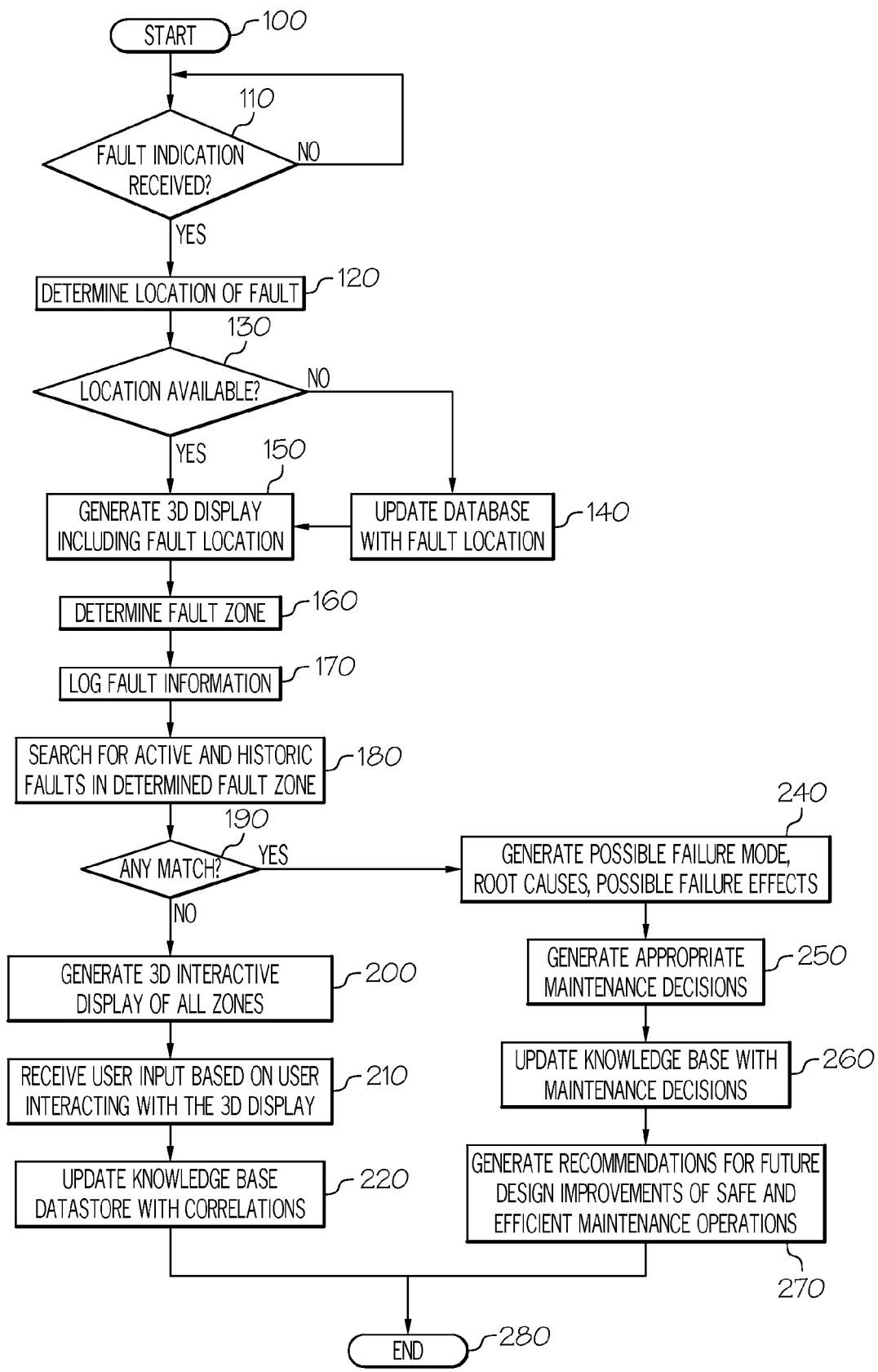
FIG. 4 is a flowchart illustrating a diagnostic method that may be performed by the diagnostic module in accordance with exemplary embodiments.

Referring now to FIG. 4, and with continued reference to FIGS. 1 and 2, a flowchart illustrates a diagnostic method that can be performed by the diagnostic module 18 of FIG. 2 in accordance with the present disclosure. As can be appreciated in light of the disclosure, the order of operation within the method is not limited to the sequential execution as illustrated in FIG. 4, but may be performed in one or more varying orders as applicable and in accordance with the present disclosure. As can further be appreciated, one or more steps may be added or removed from the method shown in FIG. 4, without altering the spirit of the method.

In various embodiments, the method can be scheduled to run based on predetermined events, and/or can run continually during operation of the aircraft 12.

The method may begin at 100. At 110, it is determined whether a fault is detected by the diagnostic systems or manually identified by a user. The fault location 46 is determined from the fault data 42 (e.g., a part number of the part associated with the fault, or other data) at 120, for example, by checking the aircraft geography datastore 38. If the fault location 46 is not available at 130, the user can provide the exact location of the fault via user input 44 at 140, which can be stored in the aircraft geography datastore 38 and retrieved later for future use. Once the fault location 46 is determined, the fault location 46 is visually represented in an interactive virtual three-dimensional model of the aircraft using, for example, a transparent skin at 150. This gives the user (e.g., a maintenance engineer) the exact location of the fault in the aircraft 12.

The fault zone 48 is identified at 160. The fault data 42 and fault location 46 are associated with the fault zone 48 and logged in the knowledge base datastore 40 at 170. The knowledge base datastore 40 is queried for active and historical faults associated with the fault zone 48 at 180.

If no historical faults exist for that particular zone at 190, the interactive virtual three dimensional model of the aircraft 12 is displayed that includes historical fault data at 200. The user interacts with the display to navigate through the zones of the aircraft 12, to select various zones of interest, to identify existing and historical faults, and/or to navigate through the timeline to identify the pattern of occurrence of faults or fault propagation and maintenance history at 210. Using the display combined with the experience and reasoning of the user, related/unrelated faults can be correlated and the correlations can be updated in the knowledge base for future reference at 220. Thereafter, the method may end at 230.

If, however, historical faults do exist for that particular fault zone 48 at 190, the fault data 42 associated with the historical faults is analyzed and the recommendations 52 of the possible failure modes, root-cause, and probable failure effects that are related to the existing fault and other unrelated faults are generated, as applicable at 240. Using the existing knowledge base for the fault, appropriate maintenance decisions 54 are generated at 250. The user can use this information to carry out necessary actions as required. The user can also suggest appropriate maintenance decisions based on experience and reasoning via user input 56 which can be stored in the knowledge base datastore 40 for future use at 260. Optionally, recommendations for future design improvements leading to better flight safety and reduced maintenance efforts can be generated at 270. Thereafter, the method may end at 230.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for a diagnosing an aircraft, comprising:
   determining a location of a fault in the aircraft;
   determining a zone of the aircraft that is associated with the location of the fault; and
   generating an interactive three-dimensional user interface based on the zone, wherein the interactive three-dimensional user interface provides fault data of historical faults and current faults associated with the zone.

2. The method of claim 1, wherein the determining comprises determining the zone of the aircraft based on a geographic location of the fault.

3. The method of claim 1, wherein the determining the zone of the aircraft comprises determining the zone based on a power supply zone of the aircraft.

4. The method of claim 1, wherein the determining the zone of the aircraft comprises determining the zone based on pneumatic zone of the aircraft.

5. The method of claim 1, wherein the determining the zone of the aircraft comprises determining the zone based on a hydraulic zone of the aircraft.

6. The method of claim 1, wherein the determining the zone of the aircraft comprises determining the zone based on a communication zone of the aircraft.

7. The method of claim 1, further comprising maintaining a knowledge base datastore with the historical fault data associated with the zone, and wherein the three-dimensional user interface provides fault data of the historical faults associated with the zone.

8. The method of claim 1, further comprising maintaining a knowledge base datastore with current fault data associated with the zone, and wherein the three-dimensional user interface provides fault data of the current faults associated with the zone.

9. The method of claim 8, further comprising generating at least one recommendation for future design based on the data in the knowledge base datastore.

10. The method of claim 8, further comprising generating maintenance decisions based on the data in the knowledge base datastore.

11. The method of claim 8, further comprising correlating one or more faults of systems within the zone based on the fault data.

12. A diagnostic system for an aircraft, comprising:
   a computer readable medium comprising:
      a first module that determines a location of a fault in the aircraft;
      a second module that determines a zone of the aircraft that is associated with the location of the fault; and
      a third module that generates an interactive three-dimensional user interface based on the zone, wherein the interactive three-dimensional user interface provides fault data of historical faults and current faults associated with the zone.

13. The diagnostic system of claim 12, wherein the interactive three-dimensional interface includes an image of the aircraft.

14. The diagnostic system of claim 13, wherein the image includes the aircraft having a transparent skin.

15. The diagnostic system of claim 12, wherein the zone of the aircraft is based on at least one of a geographic location of the fault, a power supply zone of the aircraft, a pneumatic zone of the aircraft, a hydraulic zone of the aircraft, and a communication zone of the aircraft.

16. The diagnostic system of claim 12, wherein the third module generates an interactive timeline of historical faults associated with the zone of the aircraft.

17. The diagnostic system of claim 16, wherein the timeline includes an adjustable slider bar that runs along the timeline.

18. The diagnostic system of claim 17, wherein when the slider bar is set to a particular time along the timeline, the third module generates the three-dimensional user interface having fault data associated with the zone and that occurred at that time.

19. The diagnostic system of claim 12, wherein the second module maintains a knowledge base datastore with the historical fault data associated with the zone, and wherein the three-dimensional user interface provides fault data of the historical faults associated with the zone.

20. The diagnostic system of claim 19, wherein the second module maintains a knowledge base datastore with current fault data associated with the zone, and wherein the three-dimensional user interface provides fault data of the current faults associated with the zone.

* * * * *